(12) United States Patent
Kim et al.

(10) Patent No.: US 8,773,605 B2
(45) Date of Patent: Jul. 8, 2014

(54) LIQUID CRYSTAL DISPLAY

(71) Applicant: Samsung Display Co., Ltd., Yongin (KR)

(72) Inventors: Hyun-Wuk Kim, Asan-si (KR); Jang-Kun Song, Seoul (KR); Seon-Ah Cho, Busan (KR); Eun-Je Jang, Asan-si (KR); You-Sik Shin, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/030,121

(22) Filed: Sep. 18, 2013

(65) Prior Publication Data

US 2014/0016058 A1 Jan. 16, 2014

Related U.S. Application Data

(63) Continuation of application No. 12/915,320, filed on Oct. 29, 2010, now Pat. No. 8,564,754.

(30) Foreign Application Priority Data

Jul. 6, 2010 (KR) ........................ 10-2010-0064694

(51) Int. Cl.
G02F 1/136 (2006.01)
(52) U.S. Cl.
USPC .............................. 349/48; 349/43
(58) Field of Classification Search
USPC ..................................... 349/43, 48
See application file for complete search history.

(56) References Cited

U.S. PATENT DOCUMENTS

| | | | |
|---|---|---|---|
| 7,502,087 B2 | 3/2009 | Kim et al. | |
| 2003/0223028 A1 | 12/2003 | Hirota | |
| 2005/0264744 A1 | 12/2005 | Kim et al. | |
| 2007/0229749 A1 | 10/2007 | Kaneko et al. | |
| 2007/0284627 A1 | 12/2007 | Kimura | |
| 2008/0186440 A1 | 8/2008 | Lim et al. | |
| 2008/0225194 A1 | 9/2008 | Harada et al. | |
| 2009/0207366 A1 | 8/2009 | Kim | |
| 2009/0225250 A1 | 9/2009 | Lyu et al. | |

FOREIGN PATENT DOCUMENTS

| | | |
|---|---|---|
| JP | 2004341134 A | 12/2004 |
| JP | 2005196112 A | 7/2005 |
| JP | 2005346064 A | 12/2005 |
| KR | 1020040003327 A | 1/2004 |
| KR | 1020040038250 A | 5/2004 |
| KR | 1020040038251 A | 5/2004 |
| KR | 1020050001249 A | 1/2005 |
| KR | 100710161 B | 4/2007 |
| KR | 1020080061222 A | 7/2008 |
| KR | 1020080061914 A | 7/2008 |
| KR | 1020080066333 A | 7/2008 |
| KR | 1020090037202 A | 4/2009 |

Primary Examiner — Phu Vu
(74) Attorney, Agent, or Firm — Cantor Colburn LLP

(57) ABSTRACT

A liquid crystal display includes first and second gate lines and first and second data lines, on a first substrate, a first thin film transistor connected to the first gate and data lines and including a first source and drain electrode, a second thin film transistor connected to the second gate and data lines and including a second source and drain electrode, first and second pixel electrodes contacting a portion of the first and second drain electrodes, respectively, a passivation layer on the first and second pixel electrodes and the first and second thin film transistors, and a reference electrode on a passivation layer and overlapping the first pixel electrode and the second pixel electrode. The reference electrode includes a plurality of branch electrodes. The first thin film transistor is right of the first data line and the second thin film transistor is left of the second data line.

46 Claims, 9 Drawing Sheets

LIQUID CRYSTAL DISPLAY

This application is a continuation of U.S. patent application Ser. No. 12/915,320, filed on Oct. 29, 2010, which claims priority to Korean Patent Application No. 10-2010-0064694 filed on Jul. 6, 2010, and all the benefits accruing therefrom under 35 U.S.C. §119, the entire contents of which are incorporated herein by reference.

BACKGROUND OF THE INVENTION (a) Field of the Invention
The invention relates to a liquid crystal display.
(b) Description of the Related Art
A liquid crystal display ("LCD") is one of the most widely used flat panel displays.

The liquid crystal display includes two bases of a display panel on which a field generating electrode is formed, and a liquid crystal layer interposed between the two bases. The liquid crystal display generates an electric field in the liquid crystal layer by applying voltage to the field generating electrodes, to determine a direction of liquid crystal molecules of the liquid crystal layer and controls the transmittance of light passing through the liquid crystal layer.

The liquid crystal display is advantageous in sliminess, but may have side visibility lower than front visibility. In order to overcome the problem of lower side visibility, various types of liquid crystal arrays and driving methods thereof have been developed.

As a method for implementing a wide viewing angle, a liquid crystal display where pixel electrodes and common electrodes are formed on one substrate, has been in the limelight.

However, in the case of the liquid crystal display, since a pixel electrode and a reference electrode are formed on one substrate, parasitic capacitance between the two electrodes and a data line may be increased.

In order to reduce the parasitic capacitance, when the interval between the two electrodes and the data line is increased, the aperture ratio can be reduced.

In addition, in order to increase the aperture ratio, when the reference electrode is formed on the data line, the data load is increased, thereby making it possible to increase the power consumption.

BRIEF SUMMARY OF THE INVENTION

The invention provides a liquid crystal display having advantages of reducing power consumption, without reducing the aperture ratio of a liquid crystal display.

An exemplary embodiment of the invention provides a liquid crystal display, including a first substrate, a first gate line, a second gate line, a first data line, and a second data line on the first substrate, a first thin film transistor connected to the first gate line and the first data line and including a first source electrode and a first drain electrode, a second thin film transistor connected to the second gate line and the second data line and including a second source electrode and a second drain electrode, a first pixel electrode which contacts a portion of the first drain electrode and a second pixel electrode which contacts a portion of the second drain electrode, a passivation layer on the first pixel electrode, the second pixel electrode, the first thin film transistor, and the second thin film transistor, and a reference electrode on a passivation layer and overlaps the first pixel electrode and the second pixel electrode. The reference electrode includes a plurality of branch electrodes. The first thin film transistor is positioned at the right of the first data line, and the second thin film transistor is positioned at the left of the second data line.

The first data line and the second data line may each include a curved portion.

The first data line may intersect with the first gate line forming a first tilt angle therebetween, and the second data line may intersect with the second gate line forming a second tilt angle therebetween.

The first thin film transistor may be positioned between the first gate line and the first data line forming the first tilt angle, and the second thin film transistor may be positioned between the second gate line and the second data line forming the second tilt angle. Both of the first tilt angle and the second tilt angle may be an acute angle.

The first thin film transistor may be positioned in a first pixel area and the second thin film transistor may be positioned in a second pixel area. The first pixel area and the second pixel area may be vertically adjacent to each other. A driving method of a signal applied to the first thin film transistor and the second thin film transistor may use a column inversion method.

A first signal may be applied to the first thin film transistor through the first data line, and a second signal may be applied to the second thin film transistor through the second data line. The first signal and the second signal may have different polarities The first pixel area and the second pixel area may be alternately disposed in a column direction.

A first unit in which the first pixel area is repeated at least twice, and a second unit in which the second pixel area is repeated at least twice, may be alternately disposed in the column direction.

The first thin film transistor may be positioned between the first gate line and the first data line forming a first tilt angle, and the second thin film transistor may be positioned between the second gate line and the second data line forming a second tilt angle. The first tilt angle may be an obtuse angle and second tilt angle may be an acute angle.

The plurality of branch electrodes may be positioned in parallel with a direction where the first data line and the second data line extend.

The reference electrode includes horizontal connection units that connect the branch electrodes to each other, and vertical connection units that connect the horizontal connection units to each other. The vertical connection unit overlaps with at least one of the first data line and the second data line.

The reference electrode may have an opening unit exposing the first thin film transistor and a portion of the first data line, or exposing the second thin film transistor and a portion of the second data line.

The liquid crystal display may further include a reference voltage line positioned on the first substrate. The reference voltage line may be connected to the reference electrode through a contact hole extending through the passivation layer.

The reference voltage line may comprise a connection unit contacting the reference electrode through the contact hole and extended from the reference voltage line.

An array of the connection unit in pixel areas of the liquid crystal display, may be alternately disposed at the left and right of the first data line or the second data line, respectively.

The reference voltage line may be positioned at a central portion of a pixel area of the liquid crystal display.

The first pixel electrode or the second pixel electrode may not overlap a contact portion of the reference voltage line and the reference electrode.

The reference electrodes disposed at the pixel areas adjacent to each other, may be connected to each other.

The first source electrode may be positioned on the same line as the first data line, and the second source electrode may be positioned on the same line as the second data line. The first drain electrode may extend in parallel with the first source electrode, and the second drain electrode may extend in parallel with the second source electrode.

The liquid crystal display may further include a reference voltage line positioned on the first substrate. The reference voltage line is connected to the reference electrode through a contact hole extending through the passivation layer, and the reference voltage line is positioned at a portion adjacent to the gate line. The first pixel electrode may cover a part of the first drain electrode to be connected to the first drain electrode, and the second pixel electrode may cover a part of the second drain electrode to be connected to the second drain electrode.

The liquid crystal display may further include a second substrate opposite to the first substrate, and a liquid crystal layer between the first substrate and the second substrate and has positive dielectric anisotropy.

According to the exemplary embodiment of the invention, it can reduce the power consumption due to the increase in the data load while maximizing the aperture ratio.

BRIEF DESCRIPTION OF THE DRAWINGS

The above and other advantages of this disclosure will become more apparent by describing in further detail exemplary embodiments thereof with reference to the accompanying drawings, in which.

DETAILED DESCRIPTION OF THE INVENTION

Figure 1:
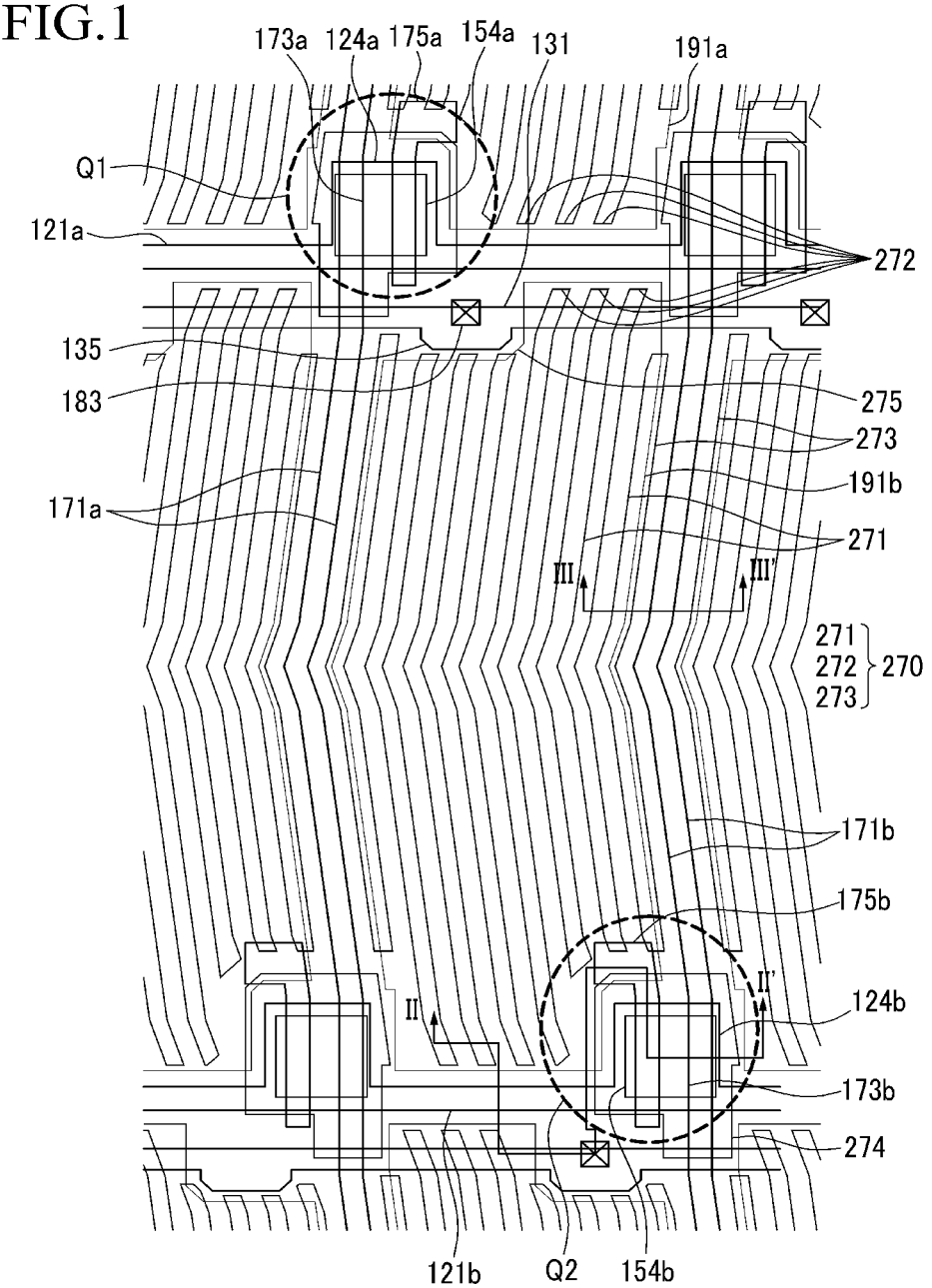
FIG. 1 is a plan view showing an exemplary embodiment of a liquid crystal display, according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention. Rather, the exemplary embodiments set forth herein are provided to a person of ordinary skilled in the art to thoroughly and completely understand contents disclosed herein and fully provide the spirit of the invention.

In the drawings, the shapes and sizes of elements may be exaggerated for clarity. Like reference numerals designate like elements throughout the specification.

It will be understood that when an element such as a layer, film, region, or substrate is referred to as being "on" or "connected to" another element, it can be directly on the other element or intervening elements may also be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items. As used herein, "connected" may indicate a physical and/or a electrical connection.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 2:
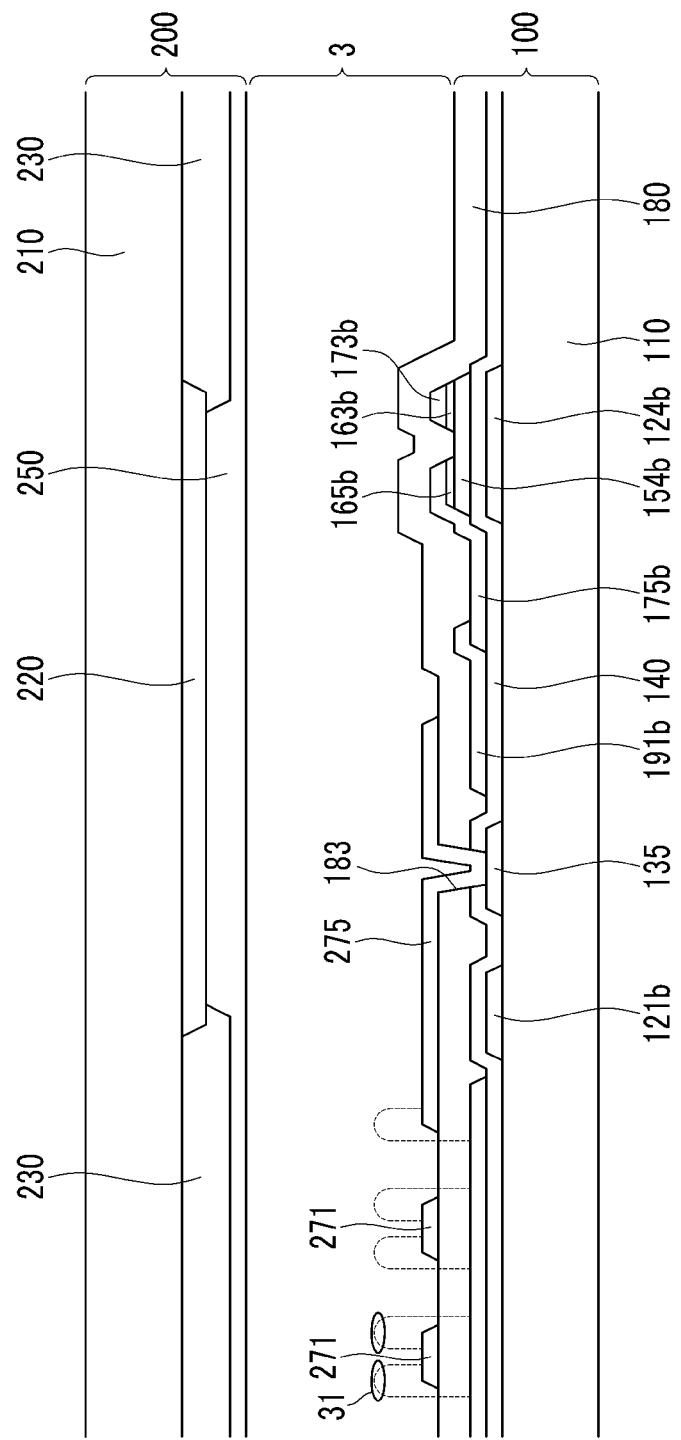
FIG. 2 is a cross-sectional view taken along line II-II' of the liquid crystal display of FIG. 1.
Figure 3:
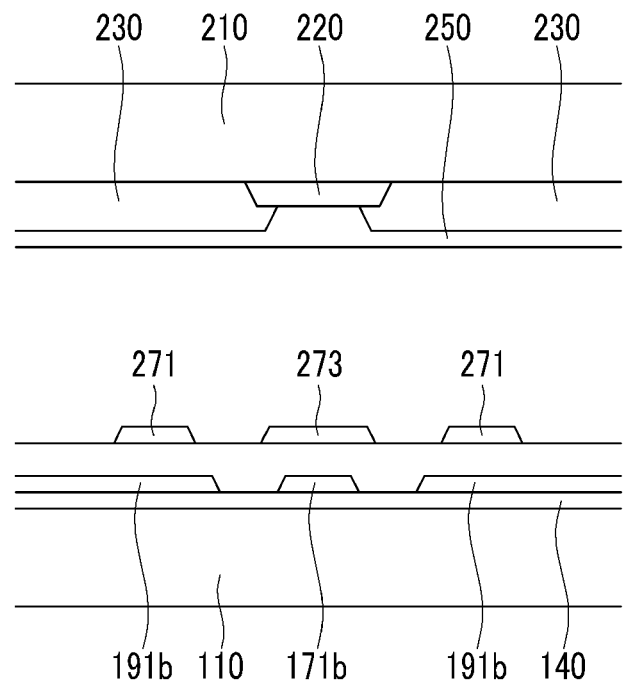
FIG. 3 is a cross-sectional view taken along line III-III' of the liquid crystal display of FIG. 1.

FIG. 1 is a plan view showing an exemplary embodiment of a liquid crystal display, according to the invention. FIG. 2 is a cross-sectional view taken along line II-II' of the liquid crystal display of FIG. 1. FIG. 3 is a cross-sectional view taken along line III-III' of the liquid crystal display of FIG. 1.

Referring to FIGS. 1 and 2, an exemplary embodiment of a liquid crystal display according to the invention includes a lower panel 100 and an upper panel 200 facing each other, and a liquid crystal layer 3 injected therebetween. The liquid crystal display includes a plurality of a pixel area. An exemplary embodiment may include the pixel areas arranged substantially in a matrix shape on the lower panel 100. A pixel area may be an independent area unit of the liquid crystal display, capable of independently controlling liquid crystal of the liquid crystal layer 3. First, the lower panel 100 will be described.

A gate conductor including a plurality of a first gate line 121a and a plurality of a second gate line 121b, and a reference voltage line 131 are on an insulating substrate 110. The insulating substrate 110 may include of transparent glass or plastic, etc.

The first and second gate lines 121a and 121b includes a wide end portion (not shown) for physical and/or electrical connecting with first and second gate electrodes 124a and 124b, respectively, and other layers or an external driving circuit. The first and second gate electrodes 124a and 124b, together with a main portion of the first and second gate lines 121a and 121b, respectively form a single unitary indivisible first gate line 121a and second gate line 121b.

The first and second gate lines 121a and 121b may include aluminum-based metal such as aluminum (Al) or aluminum alloy, etc., silver-based metal such as silver (Ag) or silver alloy, etc., copper-based metal such as copper (Cu) or copper alloy, etc., molybdenum-based metal such as metal, molybdenum (Mo) or molybdenum alloy, etc. chromium (Cr), tantalum (Ta), and titanium (Ti), or the like.

The first and second gate lines 121a and 121b may have a multilayer structure, for example, including at least two conductive layer having different physical properties.

The reference voltage line 131 transfers a predetermined reference voltage, and includes a connection unit 135 extended for connecting with a reference electrode 270 to be described below. The connection unit 135, together with a main portion of the reference voltage line 131, form a single unitary indivisible reference voltage line 131. The reference voltage line 131 may be at a central portion or lower portion of a pixel area, or may be disposed at an upper portion as shown in FIG. 1

The reference voltage line 131 is connected to the reference electrode 270 to be described below, and transfers the reference voltage to the reference electrode 270.

The reference voltage line 131 may extend substantially parallel with the first and second gate lines 121a and 121b, for example, in a first or transverse direction, and may include the same material as the first gate line 121a and the second gate line 121b.

An array of the connection unit 135 of the reference voltage line 131 in the pixel areas of the liquid crystal display, are alternately disposed at the left and right of the first data line or the second data line in the adjacent pixel areas, respectively.

A gate insulating layer 140, including silicon nitride (SiNx) or silicon oxide (SiOx), etc., is on the gate conductors 121a, 121b, and 131. As illustrated in FIG. 2, the gate insulating layer 140 is directly on the gate conductors 121a, 121b, and 131, and also contacts an upper surface of the insulating substrate 110.

The gate insulating layer 140 may have a multilayer structure including at least two insulating layers having different physical properties.

Island semiconductors 154a and 154b, including amorphous silicon or polycrystalline silicon, etc., are directly on the gate insulating layer 140.

The island semiconductors 154a and 154b partially overlap with the first and second gate electrodes 124a and 124b. That is, an entire of the island semiconductors 154a and 154b overlap a portion of the first and second gate electrodes 124a and 124b, respectively.

Ohmic contacts are similarly on both island semiconductors 154a and 154b. As illustrated in FIG. 2, ohmic contacts 163b and 165b are directly on an upper surface of island semiconductor 154b.

The ohmic contacts 163b and 165b may include a material such as n+ hydrogenated amorphous silicon doped with n type impurity such as phosphorus, etc., at a high concentration or silicide.

The ohmic contacts 163b and 165b, for example, may be arranged in a pair, to be disposed on the island semiconductors 154a and 154b.

First and second data lines 171a and 171b including first and second source electrodes 173a and 173b, respectively, and a data conductor including first and second drain electrodes 175a and 175b, are on the ohmic contacts 163b and 165b and the gate insulating layer 140.

The first and second data lines 171a and 171b include a wide end portion (not shown) for physical and/or electrical connecting with other layers or external driving circuits.

The first and second data lines 171a and 171b transfer data signals, and mainly extend in a second or vertical direction to intersect with the each of the first and second gate lines 121a and 121b, and the reference voltage line 131.

In the plan view of FIG. 1, each of the first and second data lines 171a and 171b include curved portion C (indicated by a dotted circle) having a curved or bent shape, in order to the maximum transmittance of the liquid crystal display.

In an alternative embodiment, the curved portion C may be formed in a "V" shape, such as by where the first and second data lines 171a and 171b meet each other at a middle of a pixel area. The curved portion C may further include a first curved portion and a second curved portion curved forming a predetermined angle to the first curved portion, at the middle of the pixel area.

First and second source electrodes 173a and 173b are a portion of the first and second data lines 171a and 171b, respectively, and are on the same line as the first and second data lines 171a and 171b. That is, the first and second source electrodes 173a and 173b, together with a main portion of the first and second data lines 171a and 171a, form a single unitary indivisible first data line 171a and second data line 171b.

First and second drain electrodes 175a and 175b are extended substantially in parallel with first and second source electrodes 173a and 173b, in the plan view.

Therefore, the first and second drain electrodes 175a and 175b are in parallel with a portion of the first and second data lines 171a and 171b.

The first and second gate electrodes 124a and 124b, the first and second source electrodes 173a and 173b, and the first and second drain electrodes 175a and 175b each form thin film transistors Q1 and Q2 (indicated by the dotted circles), respectively, together with the island semiconductors 154a and 154b. A channel of the thin film transistors Q1 and Q2 is on the semiconductors 154a and 154b, and between the first and second source electrodes 173a and 173b and the first and second drain electrodes 175a and 175b, respectively. The semiconductors 154a and 154b are exposed in the channel of the thin film transistors Q1 and Q2, respectively.

In the illustrated exemplary embodiment, the first and second data lines 171a and 171b define the pixel area, including a first pixel area and a second pixel area, together with the first and second gate lines 121a and 121b.

In detail, the first pixel area is defined by the first gate line 121a, the first data line 171a, and the second data line 171b, and the second pixel area is defined by the second gate line 121b, the first data line 171a, and the second data line 171b.

The first pixel area and the second pixel area are adjacent to each other in the second (e.g., vertical direction). In the first pixel area, a first thin film transistor Q1 is positioned in a middle of a region where the first data line 171a intersects with the first gate line 121a, in particular, at a right of the first data line 171a, in the plan view.

In the second pixel area, a second thin film transistor Q2 is positioned in a middle of a region where the second data line 171b intersects with the second gate line 121b, in particular, at a left of the second data line 171b, in the plan view. That is, in adjacent pixel areas, e.g., the first and second pixel areas, the thin film transistors Q1 and Q2 are alternately disposed at the left and the right of the respective pixel area, respectively.

As described above, in the illustrated exemplary embodiment of the liquid crystal display, according to the invention, an array of the thin film transistors in the pixel areas of the liquid crystal display, are alternately disposed at the left and right of the adjacent pixel areas, respectively.

In the illustrated embodiment of the liquid crystal display, according to invention, the first and second source electrodes 173a and 173b are on the same line as the first and second data lines 171a and 171b, and the first and second drain electrodes 175a and 175b extend in parallel with the first and second data lines 171a and 171b, thereby making it possible to expand the width of the thin film transistor without expanding the area occupied by the data conductor and increase the aperture ratio of the liquid crystal display.

The first and second data lines 171a and 171b, and the first and second drain electrodes 175a and 175b include a refractory metal such as molybdenum, chromium, tantalum and titanium, or the like or an alloy thereof and may have a multilayer structure including a refractory metal layer (not shown) and a low-resistance conductive layer (not shown).

In an exemplary embodiment, a multilayer structure may include a dual-layer of a lower layer made of chromium or molybdenum (alloy) and an upper layer of aluminum (alloy) and a triple layer of a lower layer of molybdenum (alloy), an intermediate layer of aluminum (alloy), and an upper layer of molybdenum (alloy).

In alternative embodiments, however, the first and second data lines 171a and 171b, and the first and second drain electrodes 175a and 175b may include various metals or conductors.

First and second pixel electrodes 191a and 191b overlap a portion of the first and second drain electrodes 175a and 175b, and overlap the gate insulating layer 140.

The first and second pixel electrodes 191a and 191b include a pair of curved edges approximately parallel with the curved portion C (indicated by the dotted circle) of the first and second data lines 171a and 171b.

The pixel electrodes 191a and 191b cover (e.g., overlap) a portion of the first and second drain electrodes 175a and 175b, respectively, and are disposed thereon to be directly connected to the first and second drain electrodes 175a and 175b both physically and electrically.

The first and second pixel electrodes 191a and 191b may include a transparent conductive material such as polycrystalline, single crystalline, or amorphous indium tine oxide ("ITO"), indium zinc oxide ("IZO"), or the like.

A passivation layer 180 is directly on the data conductors 171a, 171b, 175a, and 175b, the exposed semiconductors 154a and 154b, and/or the first an second pixel electrodes 191a and 191b.

The passivation layer 180 includes an inorganic insulator such as silicon nitride and silicon oxide, or the like.

However, in an alternative embodiment, the passivation layer 180 may include the organic insulating material, and the surface thereof may be planarized.

The organic insulating material of the passivation layer 180, may have photosensitivity, and a dielectric constant may be about 4.0 or less.

The passivation layer 180 may include a dual-layer structure of a lower inorganic layer and an upper organic layer so as not to damage portions of the exposed semiconductors 154a and 154b, while having the excellent insulating characteristics of the organic layer.

A thickness of the passivation layer 180, in a third direction perpendicular to the insulating substrate 110, may be about 5000 angstroms (Å) or more, and may be about 6000 Å to about 8000 Å.

A contact hole (not shown) exposing the end portion of the data lines 171 and 171b is extended completely through the thickness of the passivation layer 180. A contact hole 183 exposing the connection unit 135 of the reference voltage line 131, and a contact hole (not shown) exposing end portions of the first and second gate lines 121a and 121b are extended completely through thicknesses of the passivation layer 180 and the gate insulating layer 140.

The reference electrode 270 is on the passivation layer 180.

The reference electrode 270 overlaps with the first and second pixel electrodes 191a and 191b The reference electrode 270 includes a horizontal connection unit 272 that connects a plurality of first branch electrode 271 with a plurality of second branch electrodes 271, and a vertical connection unit 273 that connects the horizontal connection unit 272.

The reference electrode 270 may include a transparent conductive material such as polycrystalline, single crystalline, or amorphous indium tine oxide ("ITO"), indium zinc oxide ("IZO"), or the like.

Reference electrodes 270 respectively disposed at adjacent pixel areas are physically and/or electrically connected to each other.

The branch electrode 271 of the reference electrode 270 is extended in parallel along an extension direction of the first and second data lines 171a and 171b, and includes similar curved portions as the first and second data lines 171a and 171b.

As illustrated in FIG. 1, the first curved portion and the second curved portion of the above-mentioned first and second data lines 171a and 171b, are each disposed in parallel to a first and second curved portion of the reference electrode 270.

The horizontal connection unit 272 of the reference electrode 270 is approximately parallel with the first and second gate lines 121a and 121b, and vertically connects adjacent branch electrodes 271.

The horizontal connection unit 272 of the reference electrode 270 is at a lower portion of the pixel area. The lower portion of the pixel area includes the first and second gate electrodes 124a and 124b of the thin film transistor Q1 and Q2, island semiconductors 154a and 154b, the first and second data lines 171a and 171b, the first and second drain electrodes 175a and 175b, the first and second source electrodes 173a and 173b, and a first opening portion 274 exposing a portion of the reference voltage line 131.

The horizontal connection unit 272 of the reference electrode 270 includes a reference electrode extending portion 275 extending to the connection unit 135 of the reference voltage line 131.

The reference electrodes 270 disposed at the pixel areas adjacent to each other, are physically and/or electrically connected to each other.

The vertical connection unit 273 of the reference electrode 270 extends in parallel with and overlapping the first and second data lines 171a and 171b disposed between two adjacent pixels in the first direction. The vertically connection unit 273 includes the first opening portion 274 disposed overlapping a portion of the first and second data lines 171a and 171b.

The first opening 274 of the reference electrode 270 completely exposes a portion of the first and second data lines 171a and 171b forming the source electrodes 173a and 173b. That is, where material of the reference electrode 270 is not disposed, e.g., defining the first opening 274, an entire of the portions of the first and second data lines 171a and 171b forming the source electrodes 173a and 173b are exposed from the reference electrode 270.

The extending unit 275 of the reference electrode 270 is physically and electrically connected to the reference voltage line 131 through the contact hole 183 that is extended through both the passivation layer 180 and the gate insulating layer 140.

Although not shown, an alignment layer is on the reference electrode 270 and passivation layer 180, and the alignment layer may be a horizontal alignment layer rubbed in a predetermined direction.

The upper panel 200 will now be described.

A light blocking member 220 is on the insulating substrate 210 including transparent glass or plastic, or the like.

The light blocking member 220 is referred to as a black matrix, and prevents light leakage.

A plurality of a color filter 230 is on the insulating substrate 210.

The color filter 230 mainly exists in a region surrounded by the light blocking member 220, and may longitudinally extend in a vertical direction substantially parallel to a longitudinal extension direction of the first and second pixel electrodes 191a and 191b.

Each color filter 230 may display one of primary colors such as red, green and blue, etc.

An overcoat 250 is on the color filter 230 and the light blocking member 220, and may be the innermost layer of the upper panel 200.

The overcoat 250 may include an inorganic insulating material or an organic insulating material, reduce or effectively prevent the color filter 230 from being exposed and provide a flat (e.g., planar) surface.

In an alternative exemplary embodiment, the overcoat 250 may be omitted.

The liquid crystal layer 3 includes a nematic liquid crystal material having a positive dielectric anisotropy.

The liquid crystal layer 3 may have a structure where the major-axis direction of the liquid crystal molecule is aligned in parallel with the display panels 100 and 200, and is twisted by 90° in a spiral shape from the rubbing direction of an alignment layer of the lower display panel 100 to the upper display panel 200.

The first and second pixel electrodes 191a and 191b are applied with data voltage from the first and second drain electrodes 175a and 175b, and the reference electrode 270 receives a predetermined size of reference voltage from the reference voltage line 131.

The reference electrodes 270 of adjacent pixel areas are connected to each other to receive a reference voltage from a reference voltage applying unit disposed at the outside of the display area. However, in order to reduce or effectively prevent the voltage drop in the display area, etc., reference electrodes 270 of adjacent pixel areas receive the same size of reference voltage from the reference voltage line 131.

The first and second pixel electrodes 191a and 191b to which data voltage is applied, generate electric field together with the reference electrode 270 receiving the reference voltage, such that the liquid crystal molecule of the liquid crystal layer 3 positioned between electrodes 191a, 191b, and 270 rotates in a direction parallel with a direction of the electric field.

The polarization of light transmitting the liquid crystal layer is varied according to the rotating direction of the liquid crystal molecule determined as described above.

As described above, a liquid crystal molecule 31 of the liquid crystal layer 3 of the liquid crystal display, is rotated by the electric field generated between a side or edge of the branch electrode 271 of the reference electrode 270, and the first and second pixel electrodes 191a and 191b.

In the illustrated embodiment of the liquid crystal display according to the invention, the alignment layer is rubbed so that the liquid crystal molecule 31 is pretilted at a predetermined.

The liquid crystal molecule 31 can be rapidly rotated in the pretilted direction.

The first and second pixel electrodes 191a and 191b of the liquid crystal display of the exemplary embodiment of the invention, are disposed between the gate insulating layer 140 and the passivation layer 180. The first and second pixel electrodes 191a and 191b cover (e.g., overlap) a portion of the first and second drain electrodes 175a and 175b, to be directly connected to the first and second drain electrodes 175a and 175b physically and electrically, thereby making it possible to increase the aperture ratio as compared to the liquid crystal display connected through the contact hole.

In addition, the liquid crystal display of the exemplary embodiment of the invention includes the first and second source electrodes 173a and 173b positioned on the same line as the first and second data lines 171a and 171b, and the first and second drain electrodes 175a and 175b extending in parallel with a portion of the first and second data lines 171a and 171b, thereby making it possible to expand the width of the thin film transistor without expanding the area occupied by the data conductor and increase the aperture ratio of the liquid crystal display.

Further, in the liquid crystal display of the exemplary embodiment of the invention, the reference electrode 270 disposed directly on the passivation layer 180 at a lower portion of the pixel area which includes the first and second gate electrodes 124a and 124b of the thin film transistor, the island semiconductors 154a and 154b, the opening part 274 exposing a portion of the first and second data lines 171a and 171b forming the source electrodes 173a and 173b, and the first and second drain electrodes 175a and 175b, makes it possible to reduce the parasitic capacitance between the first and second data lines 171a and 171b and the reference electrode 270.

Further, the exemplary embodiment of the liquid crystal display according to the invention includes a portion of the reference electrode 270 extending in parallel to the first and second data lines 171a and 171b and overlapping with the first and second data lines 171a and 171b, thereby making it possible to increase the aperture ratio.

Where the aperture ratio is increased, as the overlapping portion of the reference electrode 270 and the first and second data lines 171a and 171b is increased, the data load is increased, such that the power consumption is increased.

However, the exemplary embodiment of the liquid crystal display according to the invention alternately disposes the thin film transistors Q1 and Q2 at left and right sides within adjacent pixel areas positioned in the second or vertical, and applies signals to the column inversion, thereby making it possible to implement the dot inversion.

Therefore, the power consumption due to the dot inversion can be reduced.

As described above, the exemplary embodiment of the liquid crystal display according to the invention reduces the aperture ratio of the liquid crystal display, or reduces the power consumption and the parasitic capacitance between the first and second data lines 171a and 171b and the reference electrode 270, without making the manufacturing process complicated.

Figure 4:
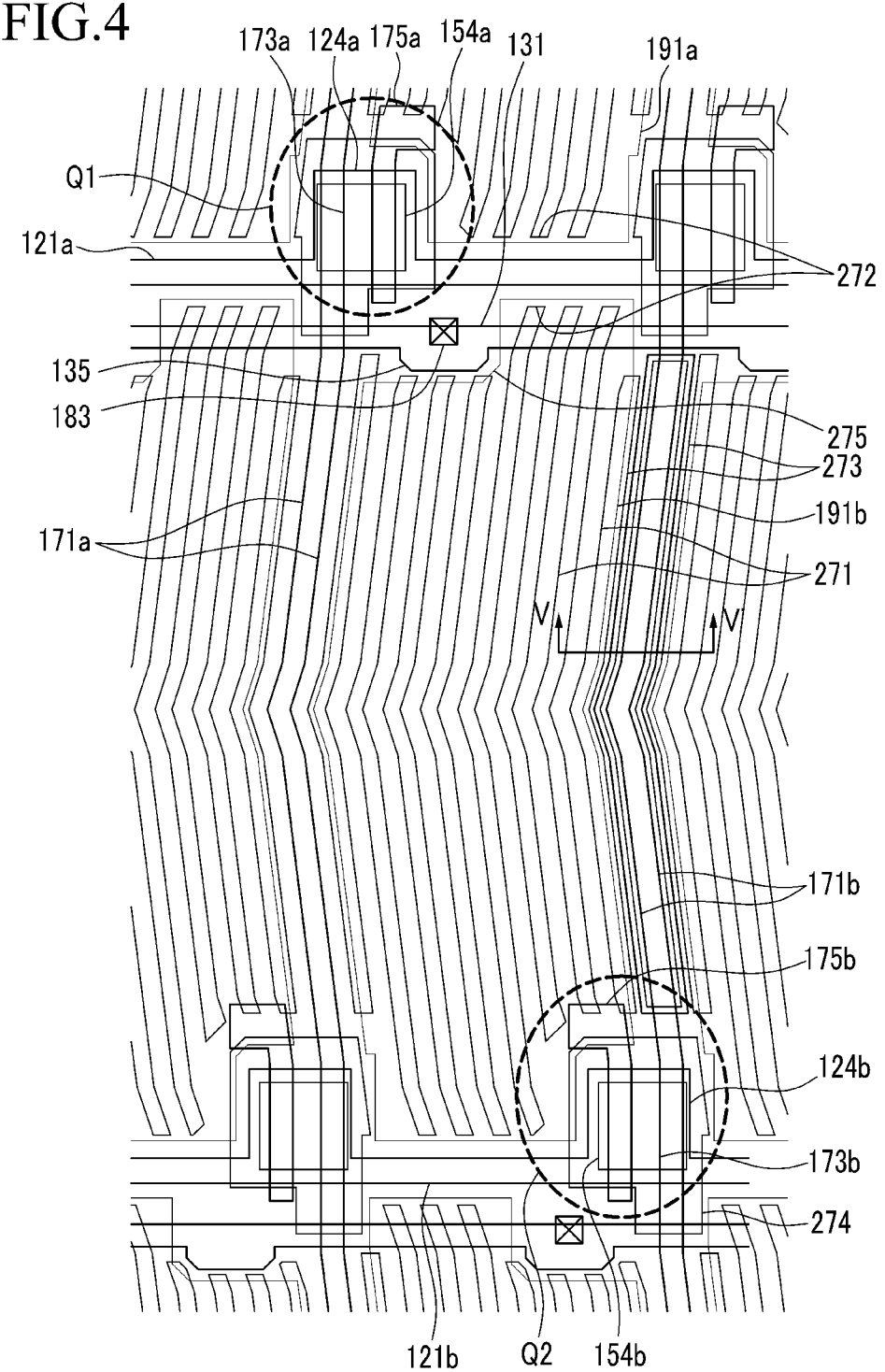
FIG. 4 is a plan view showing another exemplary embodiment of a liquid crystal display, according to the invention.

FIG. 4 is a plan view showing another exemplary embodiment of a liquid crystal display, according to the invention.

Figure 5:
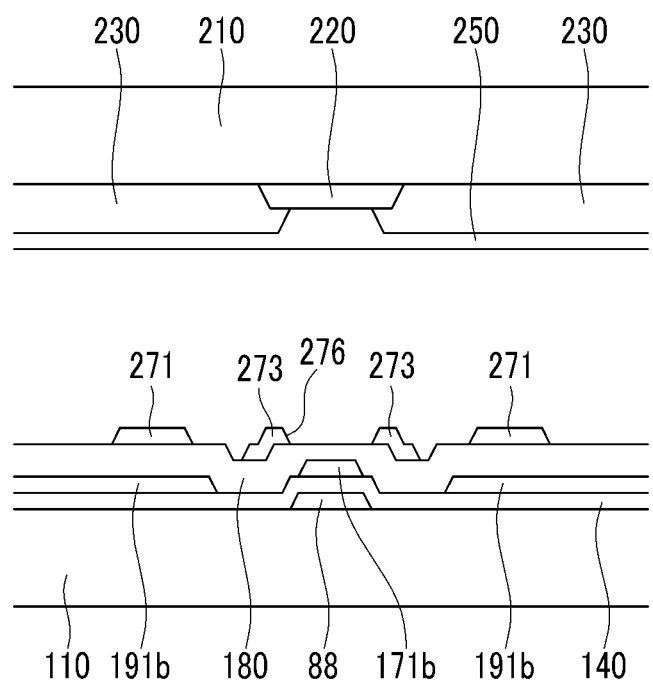
FIG. 5 is a cross-sectional view taken along line V-V' of the liquid crystal display of FIG. 4.

FIG. 5 is a cross-sectional view taken along line V-V' of the liquid crystal display of FIG. 4.

The layer structure of the liquid crystal display shown in FIGS. 4 and 5, is approximately the same as FIGS. 1, 2 and 3.

The detailed description thereof will be omitted.

However, in the illustrated embodiment of the liquid crystal display shown in FIGS. 4 and 5, unlike the liquid crystal display shown in FIGS. 1, 2, and 3, a shielding electrode 88 is overlapping the first and second data lines 171a and 171b, and a portion of the vertical connection portion 273 of the reference electrode 270 which extends to be overlapped with the first and second data lines 171a and 171b includes a second opening 276 overlapping the first and second data lines 171a and 171b.

The shielding electrode 88 may be on a same layer as the gate conductor, and/or may be floated.

The shielding electrode 88 is configured and disposed so as to reduce or effectively prevent the light leakage.

The second opening 276 of the reference electrode 270 disposed overlapping the first and second data lines 171a and 171b, may be about 50% or more of a vertical length of the first and second data lines 171a and 171b disposed in one pixel area.

As described above, the second opening 276 extended completely through a thickness of the reference electrode 270 and disposed overlapping a portion of the first and second data lines 171a and 171b is where a portion of the reference electrode 270 is not disposed, such as being removed, thereby making it possible to further reduce the parasitic capacitance between the first and second data lines 171a and 171b and the reference electrode 270.

The exemplary embodiment of the liquid crystal display in FIG. 4 according to the invention may have the aperture ratio lower than that of the liquid crystal display described in FIG. 1, but the liquid crystal display in FIG. 4 reduces the data load, thereby making it possible to further improve the power consumption.

Many features of the exemplary embodiment of FIGS. 1, 2, and 3 can be applied to the exemplary embodiment shown in FIGS. 4 and 5.

The exemplary embodiment shown in FIG. 1 will be described with reference to FIG. 6.

Figure 6:
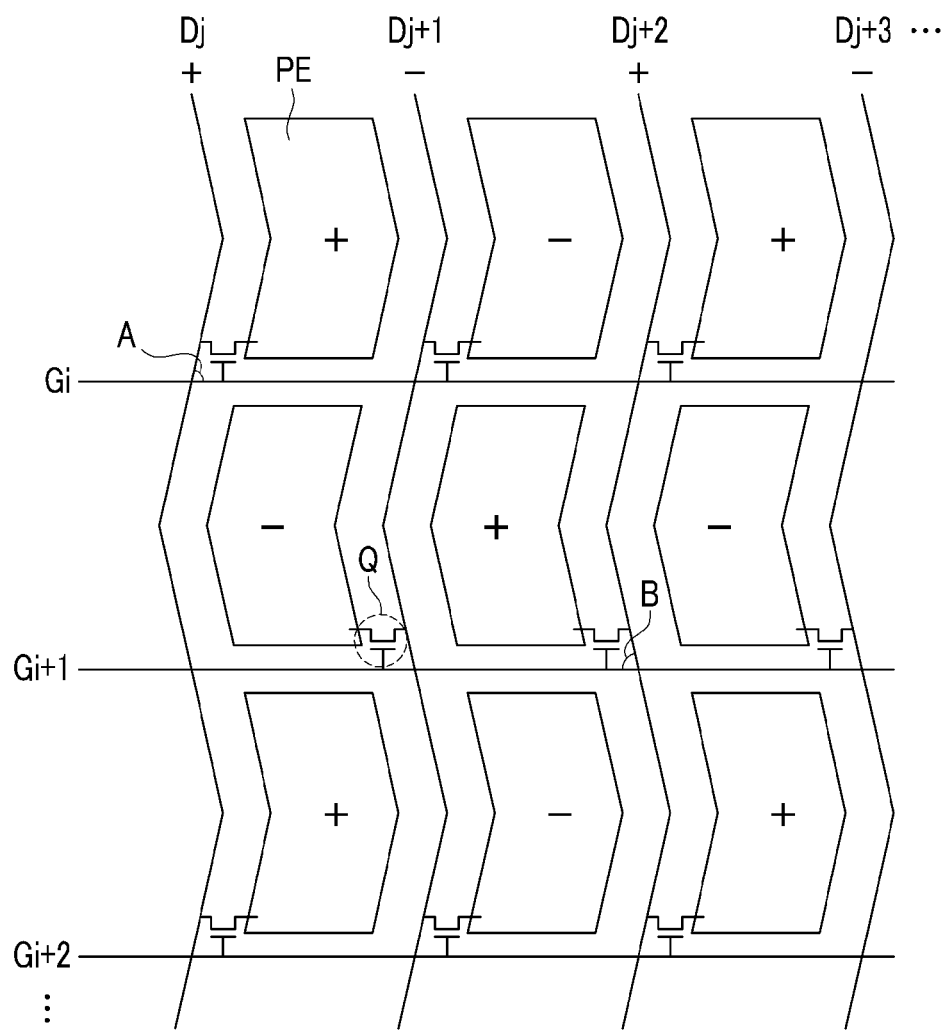
FIG. 6 is a schematic diagram of an exemplary embodiment of a pixel array and a pixel polarity of the liquid crystal display in FIG. 1.

FIG. 6 is a schematic diagram of an exemplary embodiment of a pixel array and a pixel polarity of the liquid crystal display shown in FIG. 1.

Referring to FIG. 6, data lines (Dj, Dj+1, Dj+2, Dj+3, . . . ) longitudinally extend in a column direction, and include a curved portion.

The gate lines (Gi, Gi+1, Gi+2, . . . ) and data lines (Dj, Dj+1, Dj+2, Dj+3, . . . ) intersect with each other, at a predetermined angle in the plan view.

In the column direction, the thin film transistors Q of the pixel areas adjacent to each other vertically, are disposed at the right or left relative to the data line connected to each thin film transistor Q. In the row direction, within a row of pixel areas, the thin film transistor Q may all be disposed at the left or the right of the pixel areas.

The disposition of the thin film transistor Q alternating to the left and to the right, may be repeated in the column direction for each column of pixel areas.

Curved portions of the data lines (Dj, Dj+1, Dj+2, Dj+3, . . . ) in odd numbered rows of pixel areas, are bent in different directions than the curved portions of the data lines (Dj, Dj+1, Dj+2, Dj+3, . . . ) in even numbered rows of pixel areas.

In addition, the thin film transistor Q is disposed at portions of the pixel areas where a tilt angle formed by the intersecting gate lines (Gi, Gi+1, Gi+2, . . . ) and data lines (Dj, Dj+1, Dj+2, Dj+3, . . . ) is acute angles A and B, respectively. Therefore, when the thin film transistor is formed in the same area, e.g., having the same tilt angle, etc., the aperture ratio can be further improved.

The polarity of data voltage flowing into the data line Dj positioned at the left of one pixel area, and the data line Dj+1 positioned at the right of the one pixel area, relative to one pixel electrode PE, is opposite to each other.

In the illustrated embodiment of FIG. 6, for example, the polarity of data voltage flowing into the data line Dj positioned at the left relative to one pixel electrode PE is positive polarity (+) and the polarity of data voltage flowing into the data line Dj+1 positioned at the right is negative polarity (−).

An exemplary embodiment of a driving method of the liquid crystal display according to the invention uses the column inversion method, and the thin film transistors Q are alternately disposed left and right relative to a pixel electrode PE arrayed in the above-mentioned column direction, thereby substantially performing the dot inversion driving.

Therefore, the column inversion driving may be used instead of the dot inversion driving, thereby making it possible to reduce the power consumption as a whole.

Figure 7:
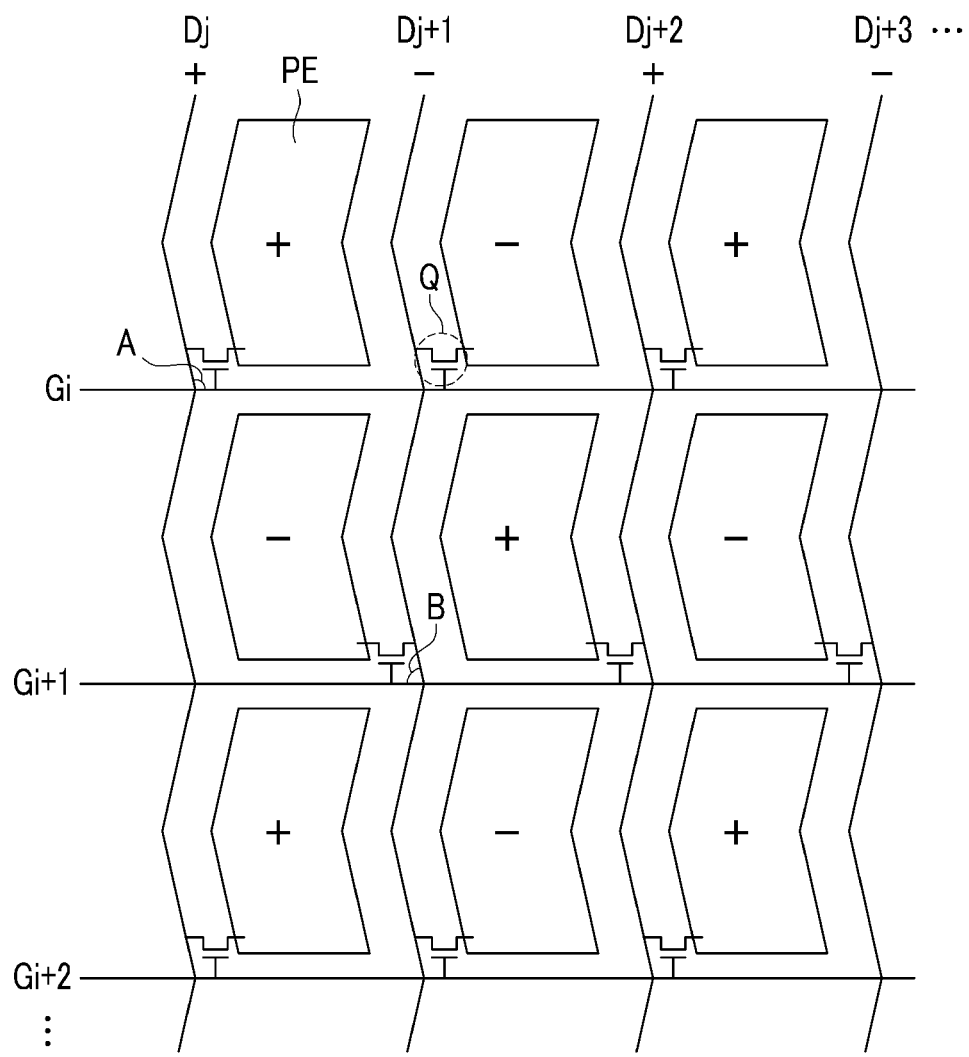
FIG. 7 is a schematic diagram showing another exemplary embodiment a pixel array and a pixel polarity of a liquid crystal display, according to the invention.

FIG. 7 is a schematic diagram showing another exemplary embodiment of a pixel array and a pixel polarity of a liquid crystal display, according to the invention. The configuration of FIG. 7 is the same as that of FIG. 6, except for a shape of the data lines (Dj, Dj+1, Dj+2, Dj+3, . . . ) in the extending direction, and the arrangement of the thin film transistors Q.

Curved portions of the data lines (Dj, Dj+1, Dj+2, Dj+3, . . . ) in odd numbered rows of pixel areas, are bent in the same directions as the curved portions of the data lines (Dj, Dj+1, Dj+2, Dj+3, . . . ) in even numbered rows of pixel areas.

In the illustrated embodiment of FIG. 7, in a portion of the pixel area rows, the thin film transistors Q connected to pixel electrodes is disposed at a portion of the pixel area where the tilt angle formed by intersecting gate lines (Gi, Gi+1, Gi+2, . . . ) and data lines (Dj, Dj+1, Dj+2, Dj+3, . . . ) is an obtuse angle A. A remaining portion of the pixel area rows includes the thin film transistors Q disposed at a portion where a tilt angle formed by intersecting gate lines (Gi, Gi+1, Gi+2, . . . ) and data lines (Dj, Dj+1, Dj+2, Dj+3, . . . ) is an acute angle B.

Figure 8:
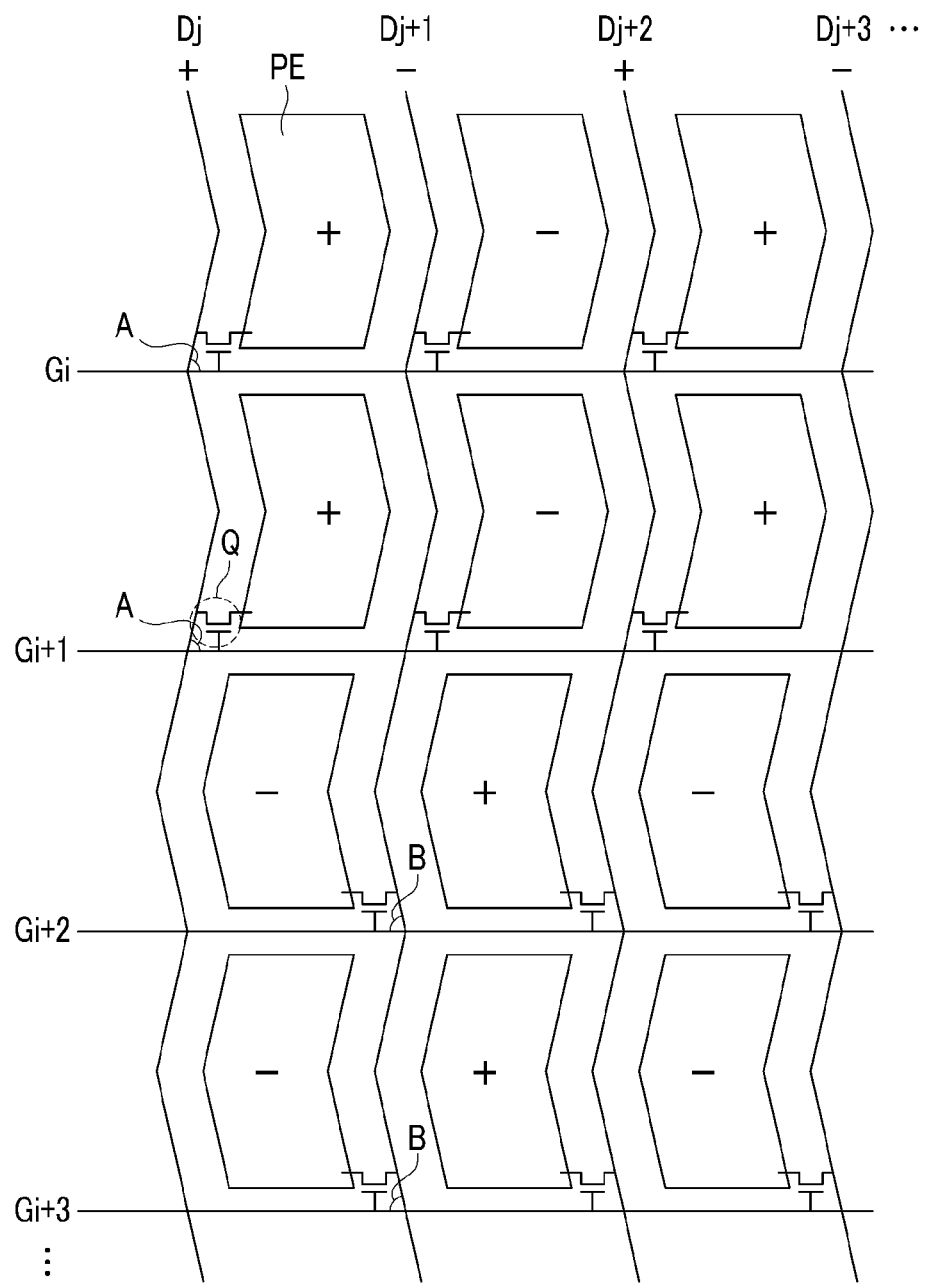
FIG. 8 is a schematic diagram showing another exemplary embodiment of a pixel array and a pixel polarity of a liquid crystal display, according to the invention.

FIG. 8 is a schematic diagram showing another exemplary embodiment of a pixel array and a pixel polarity of a liquid crystal display, according to the invention.

Referring to FIG. 8, in the column direction, a first pixel unit includes two first pixel areas adjacent to each other, and a second pixel unit includes two second pixel areas adjacent to each other. The first and second pixel units are alternately repeated in the column direction.

The first pixel areas within the first pixel unit each include the thin film transistors Q connected to the data line at the left relative to the pixel electrode PE and disposed at a portion where the tilt angle formed by an intersecting data line and gate line is an acute angle A. The second pixel areas within the second pixel unit each include the thin film transistors Q connected to the data line at the right and disposed at a portion where the tilt angle formed by an intersecting data line and gate line is an acute angle B.

Curved portions of the data lines (Dj, Dj+1, Dj+2, Dj+3, . . . ) in the first pixel unit, are bent in the different directions from the curved portions of the data lines (Dj, Dj+1, Dj+2, Dj+3, . . . ) in the second pixel unit.

In this configuration, the invention is not limited to the exemplary embodiment shown in FIG. 8, but the first pixel unit where three first pixel areas are repeated, and the second pixel unit where at least three second pixel areas are repeated, can be alternately disposed in a column direction.

Figure 9:
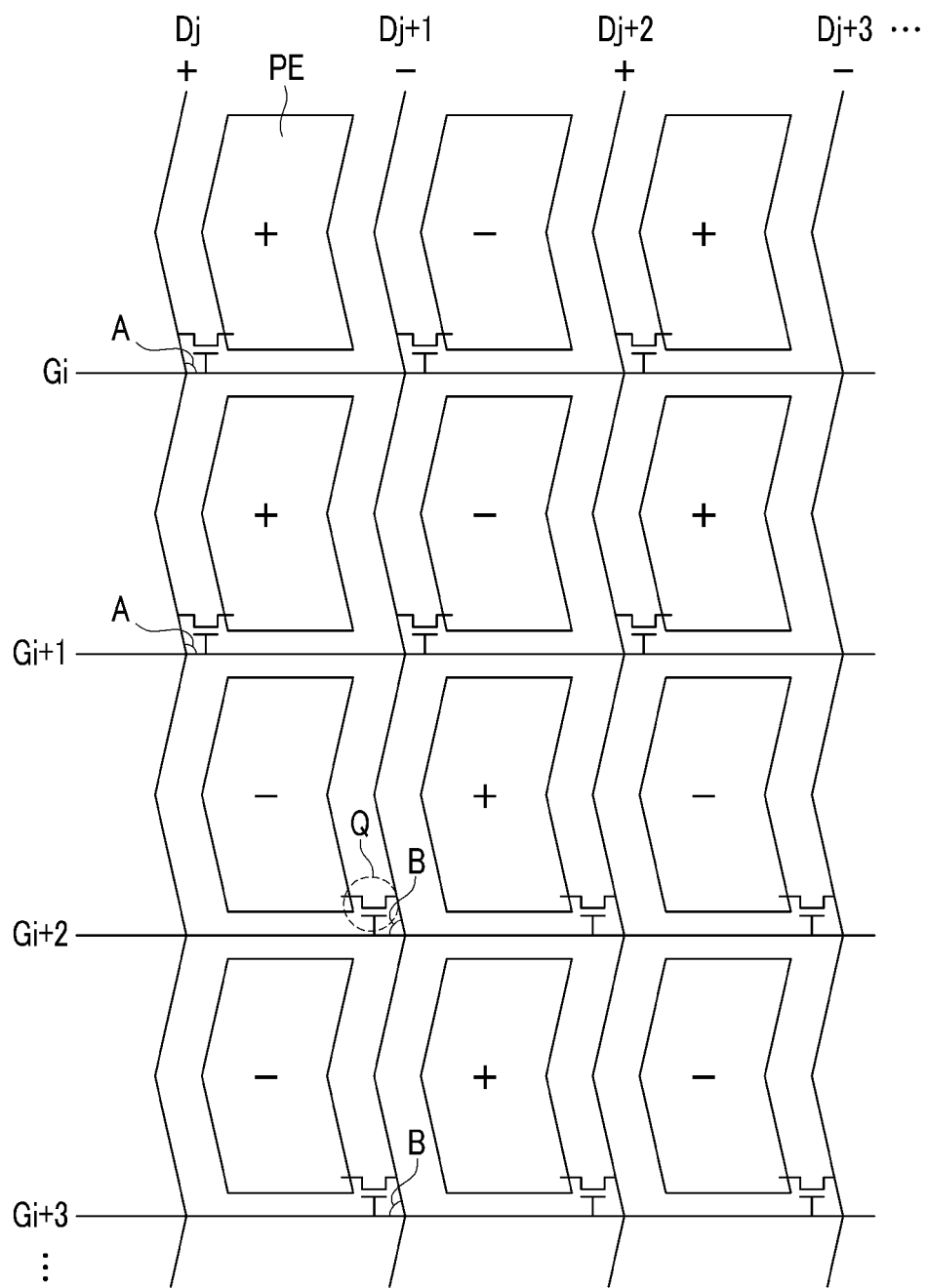
FIG. 9 is a schematic diagram showing another exemplary embodiment of a pixel array and a pixel polarity of a liquid crystal display, according to the invention.

FIG. 9 is a schematic diagram showing another exemplary embodiment of a pixel array and a pixel polarity of a liquid crystal display, according to the invention.

Referring to FIG. 9, in the column direction, a third pixel unit includes two third pixel areas adjacent to each other, and a fourth pixel unit includes two fourth pixel areas adjacent to each other. The third and fourth pixel units are alternately repeated in the column direction.

The third pixel areas within the third pixel unit each include the thin film transistors Q connected to the data line at the left relative to the pixel electrode PE and disposed at a portion where the tilt angle formed by an intersecting data line and gate line is an obtuse angle A. The fourth pixel areas within the fourth pixel unit each include the thin film transistors Q connected to the data line at the right and disposed at a portion where the tilt angle formed by an intersecting data line and gate line is an acute angle B.

Curved portions of the data lines (Dj, Dj+1, Dj+2, Dj+3, . . . ) in the first pixel unit, are bent in a same direction as the curved portions of the data lines (Dj, Dj+1, Dj+2, Dj+3, . . . ) in the second pixel unit.

In this configuration, the invention is not limited to the exemplary embodiment shown in FIG. 9, but the third pixel unit where three third pixel areas are repeated, and the fourth pixel unit where at least three fourth pixel areas are repeated can be alternately disposed in the column direction.

Alternative exemplary embodiments of the invention include a combination of all or a portion of the exemplary embodiments of FIGS. 6 to 9.

In other words, the first pixel unit where at least one first pixel area described in FIG. 8 is repeated and the second pixel unit where at least one second pixel area is repeated, and the third pixel unit where at least one third pixel area described in FIG. 9 is repeated and the fourth pixel unit where at least one fourth pixel area is repeated, can be randomly and alternately disposed in the column direction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate,
a first gate line, a second gate line, a first data line, and a second data line, and a reference voltage line on the first substrate;
a first thin film transistor connected to the first gate line and the first data line, and including a first gate electrode, a first source electrode, a first drain electrode, and a first semiconductor;
a second thin film transistor connected to the second gate line and the second data line, and including a second gate electrode, a second source electrode, a second drain electrode, and a second semiconductor;
a first pixel electrode which contacts a portion of the first drain electrode, and a second pixel electrode which contacts a portion of the second drain electrode;
a passivation layer on the first pixel electrode, the second pixel electrode, the first thin film transistor, and the second thin film transistor; and
a reference electrode on the passivation layer, and overlapping the first pixel electrode and the second pixel electrode,
wherein the reference electrode includes a plurality of branch electrodes,
wherein the first thin film transistor is right of the first data line, and the second thin film transistor is left of the second data line, in a plan view of the liquid crystal display,
wherein the first drain electrode is formed in parallel to the first data line, and the second drain electrode is formed in parallel to the second data line,
wherein the first gate electrode overlaps the first semiconductor and the first data line, and
wherein the second gate electrode overlaps the second semiconductor and the second data line.

2. The liquid crystal display of claim 1, wherein:
the first data line and the second data line each include a curved portion.

3. The liquid crystal display of claim 2, wherein:
the first data line intersects with the first gate line forming a first tilt angle; and
the second data line intersects with the second gate line forming a second tilt angle.

4. The liquid crystal display of claim 3, wherein:
the first thin film transistor is between the first gate line and the first data line forming the first tilt angle; and the second thin film transistor is between the second gate line and the second data line forming the second tilt angle, both of the first tilt angle and the second tilt angle being an acute angle.

5. The liquid crystal display of claim 4, wherein:
the first thin film transistor is in a first pixel area of the liquid crystal display, and the second thin film transistor is in a second pixel area of the liquid crystal display, and
the first pixel area and the second pixel area are adjacent to each other in a first direction.

6. The liquid crystal display of claim 5, wherein:
the first pixel area and the second pixel area are alternately disposed in the first direction.

7. The liquid crystal display of claim 6, wherein:
a first unit in which the first pixel area is repeated at least twice, and a second unit in which the second pixel area is repeated at least twice, are alternately disposed in the first direction.

8. The liquid crystal display of claim 3, wherein:
the first thin film transistor is between the first gate line and the first data line forming the first tilt angle; and
the second thin film transistor is between the second gate line and the second data line forming the second tilt angle,
the first tilt angle being an obtuse angle and the second tilt angle being an acute angle.

9. The liquid crystal display of claim 8, wherein:
the first thin film transistor is in a first pixel area of the liquid crystal display, and the second thin film transistor is in a second pixel area of the liquid crystal display, and
the first pixel area and the second pixel area are adjacent to each other in a first direction.

10. The liquid crystal display of claim 9, wherein:
the first pixel area and the second pixel area are alternately disposed in the first direction.

11. The liquid crystal display of claim 10, wherein:
a first unit in which the first pixel area is repeated at least twice, and a second unit in which the second pixel area is repeated at least twice, are alternately disposed in the first direction.

12. The liquid crystal display of claim 2, wherein:
the plurality of branch electrodes of the reference electrode extend parallel to the first data line and the second data line.

13. The liquid crystal display of claim 12, wherein:
the reference electrode further includes:
horizontal connection units which connect the branch electrodes to each other, and
vertical connection units which connect the horizontal connection units to each other,
the vertical connection units overlapping with at least one of the first data line and the second data line.

14. The liquid crystal display of claim 1, wherein:
the reference electrode includes an opening unit exposing the first thin film transistor and a portion of the first data line, or exposing the second thin film transistor and a portion of the second data line.

15. The liquid crystal display of claim 1, wherein:
the reference voltage line comprises a connection unit contacting the reference electrode through the contact hole and extended from the reference voltage line.

16. The liquid crystal display of claim 15, wherein:
an array of the connection unit in pixel areas of the liquid crystal display, are alternately disposed at the left and right of the first data line or the second data line, respectively.

17. The liquid crystal display of claim 15, wherein:
the reference voltage line is at a central portion of a pixel area of the liquid crystal display.

18. The liquid crystal display of claim 17, wherein:
the reference electrode comprises a reference electrode extending portion extending to the connection unit of the reference voltage line,
the first pixel electrode or the second pixel electrode does not overlap contact portions in which the connection unit of the reference voltage line and the reference electrode extending portion contact.

19. The liquid crystal display of claim 15, wherein:
reference electrodes in pixel areas adjacent to each other, are connected to each other.

20. The liquid crystal display of claim 1, wherein:
the first source electrode is a portion of the first data line, and the second source electrode is a portion of the second data line, the first and second data lines being single unitary indivisible members, and
the first drain electrode extends parallel to the first source electrode, and the second drain electrode extends parallel to the second source electrode.

21. The liquid crystal display of claim 1, further comprising:
a reference voltage line on the first substrate,
wherein the reference voltage contacts the reference electrode through a contact hole extending through the passivation layer, and
the reference voltage line is adjacent to the first gate line or the second gate line.

22. The liquid crystal display of claim 1, wherein:
the first pixel electrode overlaps a portion of the first drain electrode and is connected to the first drain electrode, and
the second pixel electrode overlaps a portion of the second drain electrode and is connected to the second drain electrode.

23. The liquid crystal display of claim 1, further comprising:
a second substrate opposite to the first substrate; and
a liquid crystal layer between the first substrate and the second substrate, and having positive dielectric anisotropy.

24. A liquid crystal display, comprising:
a first substrate,
a first gate line, a second gate line, a first data line, and a second data line, and a reference voltage line on the first substrate;
a first thin film transistor connected to the first gate line and the first data line, and including a first gate electrode, a first source electrode, a first drain electrode, and a first semiconductor;
a second thin film transistor connected to the second gate line and the second data line, and including a second gate electrode, a second source electrode, a second drain electrode, and a second semiconductor;
a first pixel electrode which contacts a portion of the first drain electrode, and a second pixel electrode which contacts a portion of the second drain electrode;
a passivation layer on the first pixel electrode, the second pixel electrode, the first thin film transistor, and the second thin film transistor; and
a reference electrode on the passivation layer, and overlapping the first pixel electrode and the second pixel electrode,
wherein the reference electrode includes a plurality of branch electrodes, wherein the first thin film transistor is right of the first data line, and the second thin film transistor is left of the second data line, in a plan view of the liquid crystal display, the first drain electrode directly contacts the first pixel electrode, and the second drain electrode directly contacts the second pixel electrode, wherein the first gate electrode overlaps the first semiconductor and the first data line, and wherein the second gate electrode overlaps the second semiconductor and the second data line.

25. The liquid crystal display of claim 24, wherein:
the first data line and the second data line each include a curved portion.

26. The liquid crystal display of claim 25, wherein:
the first data line intersects with the first gate line forming a first tilt angle; and
the second data line intersects with the second gate line forming a second tilt angle.

27. The liquid crystal display of claim 26, wherein:
the first thin film transistor is between the first gate line and the first data line forming the first tilt angle; and
the second thin film transistor is between the second gate line and the second data line forming the second tilt angle,
both of the first tilt angle and the second tilt angle being an acute angle.

28. The liquid crystal display of claim 27, wherein:
the first thin film transistor is in a first pixel area of the liquid crystal display, and the second thin film transistor is in a second pixel area of the liquid crystal display, and
the first pixel area and the second pixel area are adjacent to each other in a first direction.

29. The liquid crystal display of claim 28, wherein:
the first pixel area and the second pixel area are alternately disposed in the first direction.

30. The liquid crystal display of claim 29, wherein:
a first unit in which the first pixel area is repeated at least twice, and a second unit in which the second pixel area is repeated at least twice, are alternately disposed in the first direction.

31. The liquid crystal display of claim 26, wherein:
the first thin film transistor is between the first gate line and the first data line forming the first tilt angle; and
the second thin film transistor is between the second gate line and the second data line forming the second tilt angle,
the first tilt angle being an obtuse angle and the second tilt angle being an acute angle.

32. The liquid crystal display of claim 31, wherein:
the first thin film transistor is in a first pixel area of the liquid crystal display, and the second thin film transistor is in a second pixel area of the liquid crystal display, and
the first pixel area and the second pixel area are adjacent to each other in a first direction.

33. The liquid crystal display of claim 32, wherein:
the first pixel area and the second pixel area are alternately disposed in the first direction.

34. The liquid crystal display of claim 33, wherein:
a first unit in which the first pixel area is repeated at least twice, and a second unit in which the second pixel area is repeated at least twice, are alternately disposed in the first direction.

35. The liquid crystal display of claim 25, wherein:
the plurality of branch electrodes of the reference electrode extend parallel to the first data line and the second data line.

36. The liquid crystal display of claim 35, wherein:
the reference electrode further includes:
horizontal connection units which connect the branch electrodes to each other, and
vertical connection units which connect the horizontal connection units to each other,
the vertical connection units overlapping with at least one of the first data line and the second data line.

37. The liquid crystal display of claim 24, wherein:
the reference electrode includes an opening unit exposing the first thin film transistor and a portion of the first data line, or exposing the second thin film transistor and a portion of the second data line.

38. The liquid crystal display of claim 24, wherein:
the reference voltage line comprises a connection unit contacting the reference electrode through the contact hole and extended from the reference voltage line.

39. The liquid crystal display of claim 38, wherein:
an array of the connection unit in pixel areas of the liquid crystal display, are alternately disposed at the left and right of the first data line or the second data line, respectively.

40. The liquid crystal display of claim 38, wherein:
the reference voltage line is at a central portion of a pixel area of the liquid crystal display.

41. The liquid crystal display of claim 40, wherein:
the reference electrode comprises a reference electrode extending portion extending to the connection unit of the reference voltage line,
the first pixel electrode or the second pixel electrode does not overlap contact portions in which the connection unit of the reference voltage line and the reference electrode extending portion contact.

42. The liquid crystal display of claim 38, wherein:
reference electrodes in pixel areas adjacent to each other, are connected to each other.

43. The liquid crystal display of claim 24, wherein:
the first source electrode is a portion of the first data line, and the second source electrode is a portion of the second data line, the first and second data lines being single unitary indivisible members, and
the first drain electrode extends parallel to the first source electrode, and the second drain electrode extends parallel to the second source electrode.

44. The liquid crystal display of claim 24, further comprising:
a reference voltage line on the first substrate,
wherein the reference voltage contacts the reference electrode through a contact hole extending through the passivation layer, and
the reference voltage line is adjacent to the first gate line or the second gate line.

45. The liquid crystal display of claim 24, wherein:
the first pixel electrode overlaps a portion of the first drain electrode and is connected to the first drain electrode, and
the second pixel electrode overlaps a portion of the second drain electrode and is connected to the second drain electrode.

46. The liquid crystal display of claim 24, further comprising:
a second substrate opposite to the first substrate; and
a liquid crystal layer between the first substrate and the second substrate, and having positive dielectric anisotropy.

* * * * *